(12) United States Patent
Grunvald et al.

(10) Patent No.: US 6,174,460 B1
(45) Date of Patent: Jan. 16, 2001

(54) METHOD FOR PRODUCING SYNTHESIS GAS

(75) Inventors: Vladimir Robertovich Grunvald, deceased, late of Moscow, by Alexandr Vladimirovich Grunvald, Ljudmila Alexeevna Grunvald, Marina Vladimirovna Oreshina, administrators; Jury Lvovich Dolinsky; Semen Evseevich Piskunov, both of Moscow; Lev Solomonovich Tolchinsky, Khimki; Nikolai Alfredovich Plate, Moscow; July Abramovich Kolbanovsky, Moscow, all of (RU)

(73) Assignees: Experimentalny Komplex "Novye Energeticheskie Tekhnologii" (EK "Net") Obiedinennogo Instituta Vysokikh Temperatur Rossiiskoi Akademii Nauk; Institut Neftekhimicheskogo Sinteza Rossiiskoi Akademii Nauk, both of Moscow (RU)

( * ) Notice: Under 35 U.S.C. 154(b), the term of this patent shall be extended for 0 days.

(21) Appl. No.: 09/051,296

(22) PCT Filed: Jul. 31, 1997

(86) PCT No.: PCT/RU97/00248

§ 371 Date: May 8, 1998

§ 102(e) Date: May 8, 1998

(87) PCT Pub. No.: WO98/06663

PCT Pub. Date: Feb. 19, 1998

(30) Foreign Application Priority Data

Aug. 13, 1996 (RU) ................................................ 96116520

(51) Int. Cl.[7] .............................. C07C 1/02; F02B 53/04; F02B 53/00
(52) U.S. Cl. ........................... 252/373; 123/203; 123/241
(58) Field of Search ............................. 252/373; 123/203, 123/241

(56) References Cited

FOREIGN PATENT DOCUMENTS

| 0380988 | 8/1990 | (EP) . |
|---|---|---|
| 2148385 | 5/1985 | (GB) . |
| 2164951 | 4/1986 | (GB) . |
| 1831468 | 7/1993 | (SU) . |

OTHER PUBLICATIONS

Kolbanovsky Ju. et al, Impulsnoe Szhatie gazoo v khimii i teknologii, Moscow, "Nauka", 1982, pp. 148–152.

Kazarnovskii et al, Trudy of State Research Institute . . . , Moscow, "Explosive methane . . . ", 1957, vol. III, pp. 89–104.

Lykov O.P., Chemistry and Technology of Fuels and Oils, 1996, No. 3, pp. 15–24.

Primary Examiner—Paul J. Killos
Assistant Examiner—J. Parsa
(74) Attorney, Agent, or Firm—Jacobson, Price, Holman & Stern, PLLC

(57) ABSTRACT

The present invention is an improved method for producing synthesis gas from gaseous raw hydrocarbons. The method includes combustion of a mixture of raw hydrocarbons and air at =0.5–0.8. The hydrocarbons are oxidized during the compression stroke of a piston in the cylinder of a modified internal combustion engine. The resulting products are expanded and cooled during the movement of the piston toward the bottom dead center. The products containing the synthesis gas are then expelled from the reaction volume when the piston moves toward the top dead center. A new portion of the working mixture is supplied when the piston moves back to the bottom dead center. The mixture of raw hydrocarbons with air is preheated to 200–450° C. before being fed into the cylinders of the modified internal combustion engine. The mixture is compressed until self-ignition takes place. A temperature of 1300–2300° C. is maintained over a time period of 10-2-10-3 s. The cycle is repeated with a frequency exceeding 350 min-1. The method may use as raw material methane, ethane, or other gaseous hydrocarbons mainly produced during the separation of the large fraction of light hydrocarbons from petroleum gas. The specific productivity of the method is about 2.5 times higher than known methods, making it possible to improve the ecological situation in regions of oil production and processing.

1 Claim, 1 Drawing Sheet

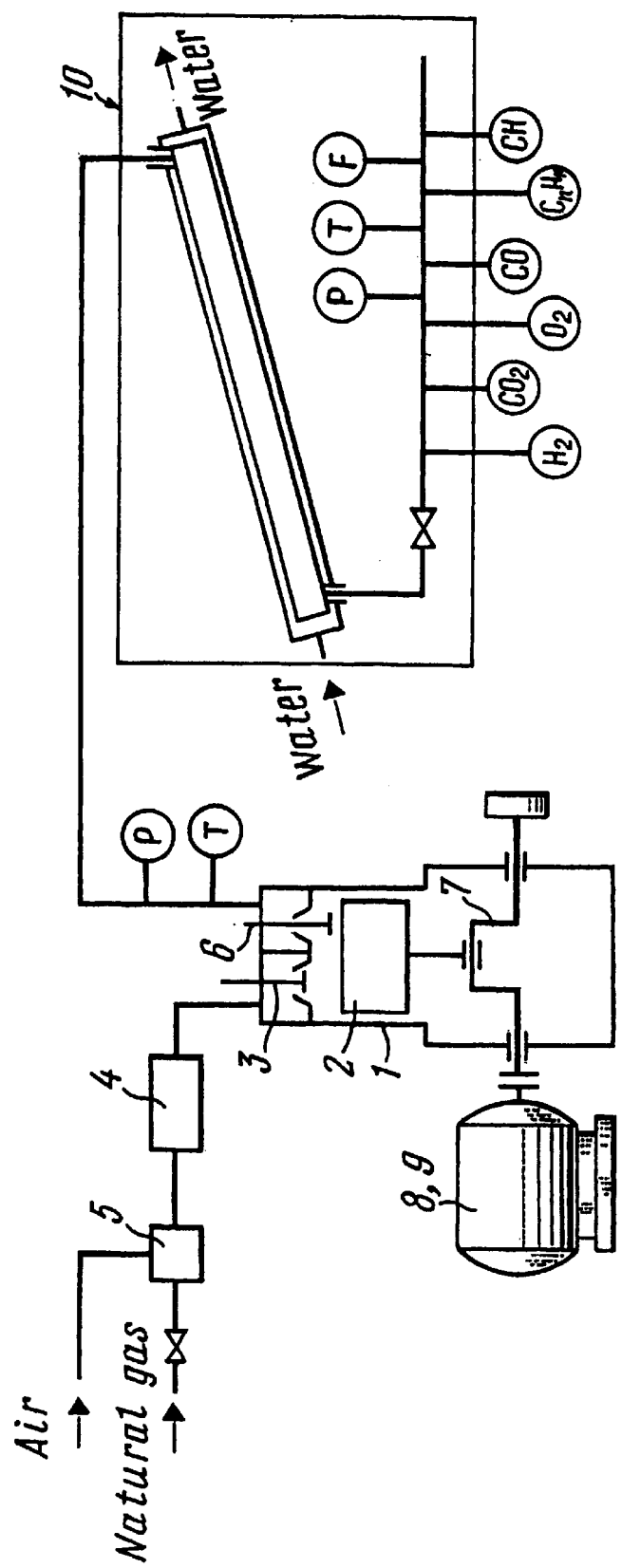

METHOD FOR PRODUCING SYNTHESIS GAS

This application is a 371 of international application number PCT/RU97/00248 filed on Jul. 31, 1997.

AREA OF THE INVENTION

This invention relates to the technology of hydrocarbon processing and more particularly to the production of synthesis gas from gaseous hydrocarbon raw material.

DESCRIPTION OF THE PRIOR ART

The method for producing synthesis gas from hydrocarbon raw material, which involves mixing the raw mixture with an oxidizer, oxygen or oxygen-containing gas, or water vapor, feeding the mixture to the reaction zone at a temperature, which is 93° C. no less than the self-ignition point of the mixture, at a rate of the turbulent flow exceeding the rate of flame flash-back, and conversion of the mixture in the presence of monolytic catalyst, is disclosed in RF Pat. 1,831,468, to Danster, M. And Kornchak, D. Method of producing synthesis gas from hydrocarbon raw, Byul. Izobret., 1993, no. 28, Int. Cl.: CO1B3/38.

The above method needs creation of a special catalytic reactor and the usage of a selective catalyst.

Other methods of incomplete oxidation of hydrocarbon raw material used, for example, to produce synthesis gas are known:

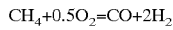

$$CH_4 + 0.5O_2 = CO + 2H_2$$

The most similar to the present invention is the method for producing synthesis gas disclosed in (Kazarnovskii, Ya. S., Derevyanko, I. G., Stezhinskii, A. I., and Kobozev, N. I., Explosive methane conversion. Trudy of State Research Institute of Nitrogen Industry, Moscow, 1957, vol. VIII, pp. 89–104). The said method comprises combustion of a gas mixture composed of hydrocarbon raw material and oxygen-enriched air at $\alpha=0.5$–$0.8$ or air not enriched with oxygen at $\alpha=0.827$–$1.2$, explosive partial oxidation of hydrocarbons in the cylinder of an internal combustion engine, expansion and cooling the products when the piston of the engine moves to the bottom dead center, output of the products containing the synthesis gas from the reactive volume when the piston moves to the top dead center, and input of a new portion of the working mixture when the piston moves to the bottom dead center. Enriched gas from coke production is usually used as the hydrocarbon raw material, which predominantly contains carbon oxide and methane and ethylene fractions. The mixture of said raw material and air is supplied into the cylinders of the internal combustion engine, and the explosive partial oxidation is preceded by the forced ignition of the mixture. The specific productivity of the process with respect to the hydrocarbon raw material is about 700 kg/m³h.

The production of synthesis gas is combined with electric power production.

The use of the enriched gas of coke production, the product of natural gas processing, rather than the natural gas itself makes the synthesis gas production tied to the coke production facilities.

In addition, when this method uses air not enriched with oxygen at $\alpha=0.827$–$1.2$, the content of $CO_2$ is 1.5–2 times higher than that of CO, and the content of hydrogen does not satisfy the synthesis demands, while, at $\alpha>1$, hydrogen is absent at all. Thus, for not enriched air at $\alpha=0.827$, the ratio $H_2/CO$ is 0.76 and, in any example, does not reach the value of 2.0 generally accepted in methanol synthesis.

When the method is realized with oxygen-enriched air at $\alpha=0.5$–$0.8$ (the content of oxygen is 29 and 50%, respectively, for the values of $\alpha$ indicated above) the ratio $H_2/CO$ does not satisfy the demands of catalytic synthesis (in some examples, this ratio is less than unity). At $\alpha=0.8$, the contents of $CO_2$ and CO are equal.

DISCLOSURE OF THE INVENTION

The object of this invention is to provide the method for producing synthesis gas useful in catalytic processing.

This method allows production of synthesis gas in commercial slightly modified internal combustion engines. This invention utilizes compression self-ignition and external mixture preparation.

The use of methane, ethane, and other gaseous hydrocarbons as raw materials, including the broad fraction of light hydrocarbons from the associated gases makes it possible to improve the ecological situation in the regions of oil production and processing. The specific productivity of this method is 2.5–3 times higher than in the method referred to above, and the volume ratios $H_2/CO=1$–$2$, depending on the process regime and composition of raw material. This is of particular importance, because the efficiency of synthesis gas production is known to affect significantly the economy of synthetic motor fuel production (Lykov, O. P., Chemistry and Technology of Fuels and Oils. 1996, no. 3, pp. 15–24).

The object of the present invention is to provide an improved process, which includes combustion of the mixture of raw hydrocarbons with air and oxidation of hydrocarbons upon the compression stroke of the piston in the cylinders of the modified internal combustion engine, expansion and cooling of the products during the piston stroke to the bottom dead center, output of the products containing synthesis gas from the reaction volume upon the piston stroke to the top dead center, inlet of a new portion of the working mixture upon the piston stroke to the bottom dead center, wherein the mixture of raw hydrocarbons with air at $\alpha=0.5$–$0.8$ preheated to 200–450° C. is fed into the cylinders of the modified internal combustion engine, and the mixture is compressed until self-ignition takes place and a temperature of 1300–2300° C. is maintained over a $10^{-2}$–$10^{-3}$s period, and the cycle is repeated with a frequency exceeding 350 $min^{-1}$.

When the mixture of air and hydrocarbon raw material is preheated to the temperature lower than 200° C., no self-ignition takes place in the cylinder of the modified internal combustion engine. The choice of the upper temperature limit for preheating the mixture (450° C.) is based on safety considerations relating to the possible self-ignition of the mixture before it reaches the reaction volume.

When the content of air in its mixture with hydrocarbon corresponds to $\alpha<0.5$, the intense carbon black formation takes place and, thus, the synthesis gas quality gets worse. At the content of air corresponding to $\alpha>0.8$, the share of $CO_2$ in the exhaust gases becomes greater than that of CO. This also deteriorates the synthesis gas quality (Kazamovskii, Ya. S., Derevyanko, I. G., Stezhinskii, A. I., and Kobozev, N. I., Explosive methane conversion. Trudy of State Research Institute of Nitrogen Industry, Moscow, 1957, vol. VIII, pp. 89–104).

The lower temperature limit (1300° C.) is selected so as to ensure high conversion in the partial oxidation of the hydrocarbon raw material. The upper temperature limit (2300° C.) is selected so as to eliminate the black carbon formation at the low values of α claimed and to provide survivability of the outlet valves.

The cycle frequency should exceed 350 min$^{-1}$ because no self-ignition takes place with slow compression.

When the partial oxidation is accomplished at temperatures referred to above over a period >10$^{-2}$s, the yield of the target product decreases.

The partial oxidation accomplished at temperatures referred to above over a period <10$^{-3}$s requires such an increase in the engine rotation speed that the inertial loads rise to the levels higher than allowable ones with respect to the strength considerations.

The method is accomplished as follows:
1. The raw hydrocarbon material is premixed with air to achieve α=0.5–0.8.
2. The prepared mixture is heated to a temperature of 200–450° C.
3. The preheated mixture is drawn into the cylinder of the modified internal combustion engine type during the motion of the piston to the bottom dead center.
4. The partial oxidation of hydrocarbons is accomplished by compression of the mixture in the cylinder by means of the piston stroke to the upper dead center until self-ignition of the mixture takes place and a temperature of 1200–2300° C. is maintained over the period of 10$^{-2}$–10$^{-3}$s.
5. The products are cooled by expansion during the piston stroke to the bottom dead center.
6. The process products containing synthesis gas are removed out of the cylinder during the piston stroke to the upper dead center.
7. The cycle is repeated at a frequency exceeding 350 min$^{-1}$.
8. The kinetic energy of the engine motion is used to produce energy in the generator connected to the engine shaft.

BRIEF DESCRIPTION OF DRAWING

The method for producing synthesis gas is more fully described with reference to the accompanying drawing, which shows the scheme of the setup.

The setup consists of the chemical compression reactor based on the modified internal combustion engine. It includes cylinder 1, representing the closed reaction volume, wherein piston 2 is disposed, the intake valve 3 arranged in the zone of the top dead center of the cylinder 1 and intended to deliver the mixture of the oxidant and hydrocarbon raw material and connected by a piping with reactor 4, where the said mixture is preheated, connected with mixer 5 of the said components of the raw material, and the outlet valve 6 disposed in the zone of the top dead center of the cylinder 1 and intended to remove the products. Piston 2 of cylinder 1 is connected with crank drive. Crankshaft of drive 7 is connected either with the electric motor 8, or with a drive of another type, depending on the extent of autonomy of the setup and conditions of its operation. Generator 9 is installed on the same shaft of the internal combustion engine.

The setup is equipped with the system for preparing the working mixture from the hydrocarbon raw material and air, which includes the dosing apparatus and measuring devices. The reactor 4, where the working mixture is preheated, includes the heater or the recuperative exchanger-preheater, where the products are directed from the engine cylinder 1.

The operation of the setup and realization of the method proceed as follows.

The hydrocarbon raw material and air are fed at the ratios referred to above into mixer 5. The mixture is fed into reactor 4 and the mixture is preheated to the temperatures referred to above. The preheated mixture is supplied through valve 3 into cylinder 1, where upon the movement of piston 2 to the top dead center 8, the mixture is compressed until self-ignition takes place and a temperature of 1400–2300° C. is maintained over a time period of 10$^{-2}$10$^{-3}$s, during which combustion and thermal decomposition of the working mixture are accomplished.

When piston 2 moves in cylinder 1 downwards the bottom dead center, the products are expanded, cooled, and quenched, the thermal energy of the products being converted to the mechanical energy of the motion mechanism utilized by means of generator 9. During the subsequent stroke of piston 2 to the top dead center, the products are removed from cylinder 1 through the outlet valve 6. A new portion of the working mixture is fed into cylinder 1 through intake valve 3 when piston 2 moves to the bottom dead center. The reciprocal motion of piston 2 in the cylinder 1 is performed at a frequency not less than 350 min$^{-1}$.

Examples of the present invention are presented in the Table. The method is accomplished by means of a setup which includes the modified Ch8,5/11(1R2–6) two-cylinder diesel engine with an effective volume of 1.24 l processing the hydrocarbon raw material.

As is seen from the Table, the $H_2/CO$ volume ratio lies in the claimed range (1–2). It is quite suitable for further catalytic production of fuel, methanol, or dimethyl ether. The conversion of the natural gas is close to 100%. In addition, the specific productivity of the process with respect to the raw material amounts to 1400–2000 kg/m$^3$h. This is 2.5–3 times higher as compared to the prototype.

Examples 6–10 illustrate possible technological variations within the framework of this method. Thus, the pressure at the outlet, temperature of preheating, and the phase of the mixture ignition can be controlled if some amount of process gases are left in a cylinder (including water vapors).

TABLE

| No | Composition of hydrocarbon raw material, vol. % | Rate of raw material, g/s | Rate of air, g/s | α | Preheating of the mixture, ° C. | Decomposition, ° C. (max) | Duration of process, s | Conversion, % | Composition of synthesis gas, vol. % | Specific productivity with respect to raw material, kg/m$^3$h | Power produced, kWh | Rotation speed, min$^{-1}$ |
|---|---|---|---|---|---|---|---|---|---|---|---|---|
| 1 | 2 | 3 | 4 | 5 | 6 | 7 | 8 | 9 | 10 | 11 | 12 | 13 |
| 1 | $CH_4$ - 99.8 $C_nH_m$ - 0.2 | 0.72 | 7.25 | 0.50 | 450 | 1627 | 10$^{-2}$ | 97 | $H_2$ - 22.0 CO - 11.0 $CO_2$ - 2.0 $CH_4$ - 0.4 | 2010 | 2.6 | 350 |

TABLE-continued

| No 1 | Composition of hydrocarbon raw material, vol. % 2 | Rate of raw material, g/s 3 | Rate of air, g/s 4 | α 5 | Preheating of the mixture, °C. 6 | Decomposition, °C. (max) 7 | Duration of process, s 8 | Conversion, % 9 | Composition of synthesis gas, vol. % 10 | Specific productivity with respect to raw material, kg/m$^3$h 11 | Power produced, kWh 12 | Rotation speed, min$^{-1}$ 13 |
|---|---|---|---|---|---|---|---|---|---|---|---|---|
| 2 | $CH_4$ - 99.8<br>$C_nH_m$ - 0.2 | 0.5 | 8.0 | 0.80 | 200 | 1300 | $10^{-2}$ | 88 | $H_2$ - 19.0<br>CO - 13.1<br>$CO_2$ - 1.6<br>$CH_4$ - 2.0 | 1396 | 1.0 | 350 |
| 3 | $CH_4$ - 99.8<br>$C_nH_m$ - 0.2 | 0.5 | 8.0 | 0.80 | 450 | 2300 | $10^{-2}$ | 98.7 | $H_2$ - 23.1<br>CO - 13.2<br>$CO_2$ - 3.5<br>$CH_4$ - 0.3 | 1396 | 2.0 | 350 |
| 4 | $C_3H_8$ - 57.1<br>$C_3H_6$ - 3.5<br>$C_4H_8$ - 14<br>$C_4H_{10}$ - 25.4 | 0.7 | 8.0 | 0.70 | 450 | 1300 | $10^{-3}$ | 90 | $H_2$ - 20.3<br>CO - 14.2<br>$CO_2$ - 2.2<br>$CH_4$ - 1.6 | 2000 | 3.5 | 2005 |
| 5 | $CH_4$ - 99.8<br>$C_nH_m$ - 0.2 | 0.62 | 7.7 | 0.62 | 350 | 1620 | $3.1 \times 10^{-3}$ | 95 | $H_2$ - 22.2<br>CO - 11.84<br>$CO_2$ - 2.1<br>$CH_4$ - 0.5 | 1800 | 1.3 | 960 |
| 6 | $CH_4$ - 99.8<br>$C_nH_m$ - 0.2 | 0.71<br>r/g 1.36<br>% 17 | 5.9 | 0.5 | 400 | 1520 | $10^{-2}$ | 97 | $H_2$ - 21.0<br>CO - 13.0<br>$CO_2$ - 0.9<br>$CH_4$ - 1.7 | 1615 | 1.37 | 350 |
| 7 | $CH_4$ - 99.8<br>$C_nH_m$ - 0.2 | 0.46<br>r/g 1.36<br>% 17.3 | 6.03 | 0.6 | 400 | 1310 | $10^{-2}$ | 89 | $H_2$ - 15.3<br>CO - 11.0<br>$CO_2$ - 0.3<br>$CH_4$ - 2.9 | 1170 | 0.9 | 350 |
| 8 | $CH_4$ - 99.8<br>$C_nH_m$ - 0.2 | 0.3<br>r/g 2.04<br>% 26.4 | 5.24 | 0.5 | 400 | 1900 | $10^{-2}$ | 97.3 | $H_2$ - 23.0<br>CO - 11.7<br>$CO_2$ - 1.3<br>$CH_4$ - 2.1 | 1090 | 1.45 | 350 |
| 9 | $CH_4$ - 99.8<br>$C_nH_m$ - 0.2 | 0.3<br>r/g 2.07<br>% 23.8 | 6.28 | 0.8 | 180 | 1730 | $10^{-2}$ | 87 | $H_2$ - 19.0<br>CO - 11.7<br>$CO_2$ - 1.3<br>$CH_4$ - 2.1 | 750 | 1.1 | 350 |
| 10 | $C_3H_8$ - 57.1<br>$C_3H_6$ - 3.5<br>$C_4H_8$ - 14<br>$C_4H_{10}$ - 25.4 | 0.33<br>r/g 1.32<br>% 15.8 | 6.73 | 0.7 | 400 | 1510 | $3.1 \times 10^{-3}$ | 91 | $H_2$ - 19.3<br>CO - 15.7<br>$CO_2$ - 2.1<br>$CH_4$ - 1.9 | 1370 | 1.7 | 2005 |

Notes to the Table
1. In column 3: r/g is the consumption of residual gases, and % is the weight percent of the residual gases in the mixture under compression
2. In examples 6–9, the composition of the remaining gases corresponds to the composition of the products in examples 1–3, and 5, respectively, and, in example 10, corresponds to that in example 4 (with account of water content).

What is claimed is:

1. A method of producing synthesis gas comprising combustion of a mixture of hydrocarbon raw material with air and partial oxidation of hydrocarbons during the compression stroke of a piston in the cylinders of an internal combustion engine, expansion and cooling the products upon the piston stroke to the bottom dead center, removal of the products containing the synthesis gas from the reaction volume upon the piston stroke to the top dead center, and introduction of a fresh portion of the working mixture upon the piston stroke to the bottom dead center, differing by that a mixture of hydrocarbon raw material and air at =0.5–0.8 preheated to 200–450° C. is supplied into the compression type internal combustion engine, the piston is attached to a crank mechanism, and the mixture is compressed until self-ignition takes place and a temperature of 1300–2300° C. is maintained over a period of $10^{-2}$–$10^{-3}$s, and the cycle is repeated with a frequency higher that 350 min$^{-1}$.

* * * * *